INVENTORS
HAYNES A. LEE, JR.
BY WARREN H. TURNER
Donald F. Wedding
and W. A. Schaich
ATTORNEYS

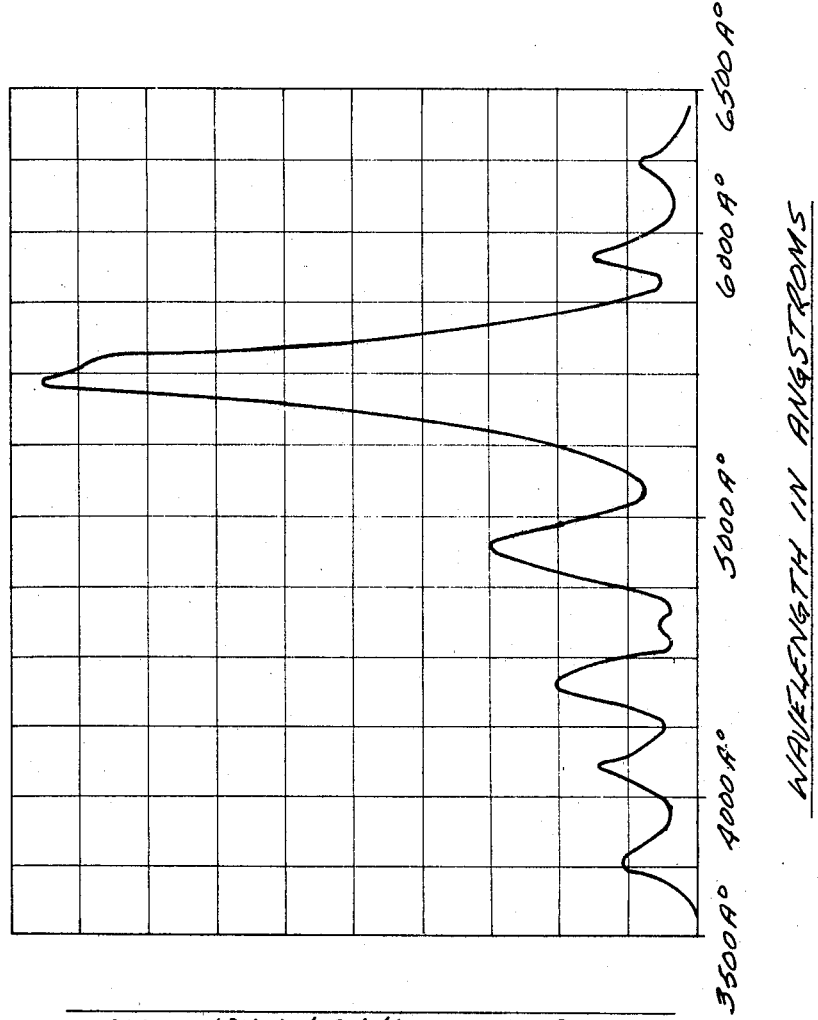

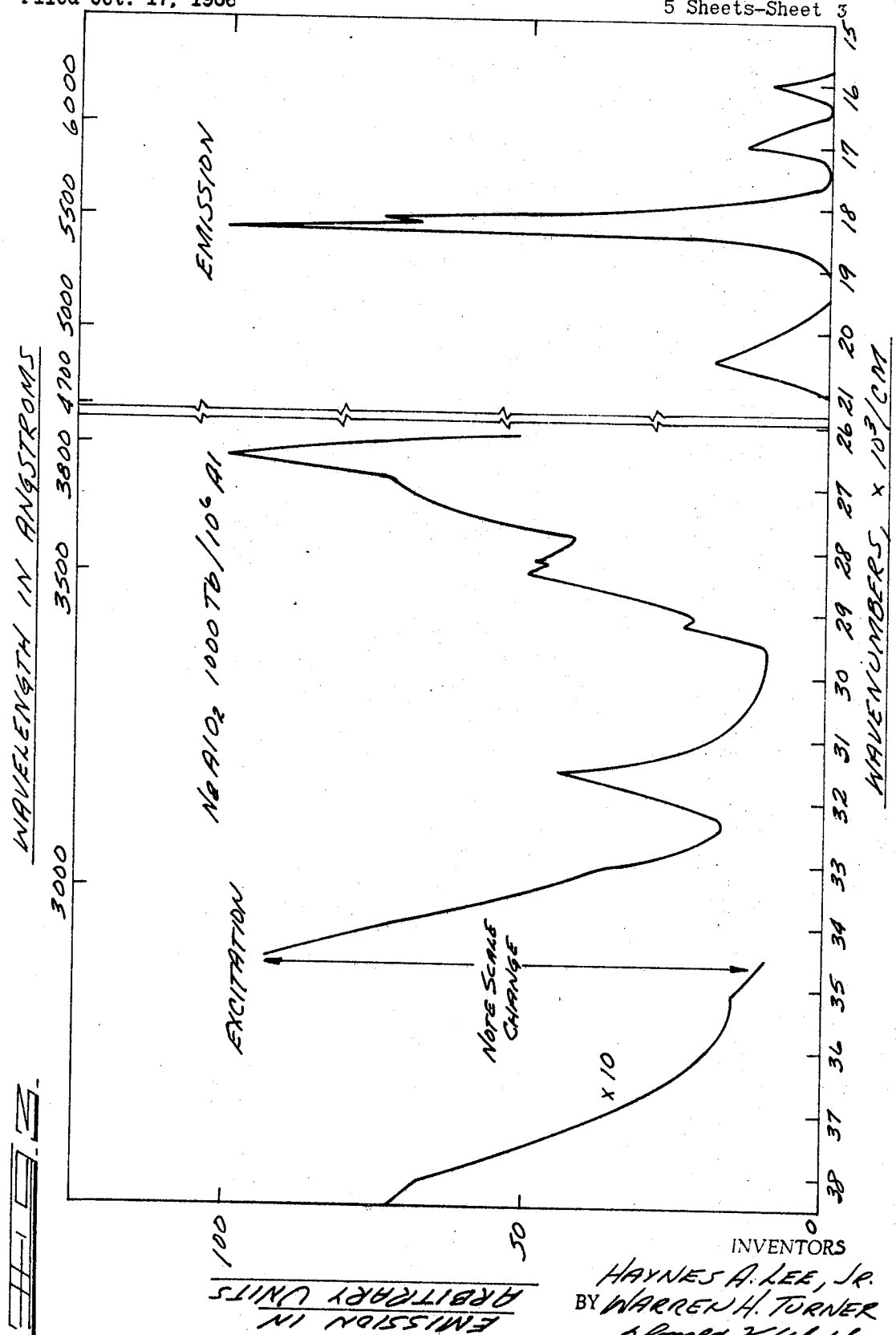

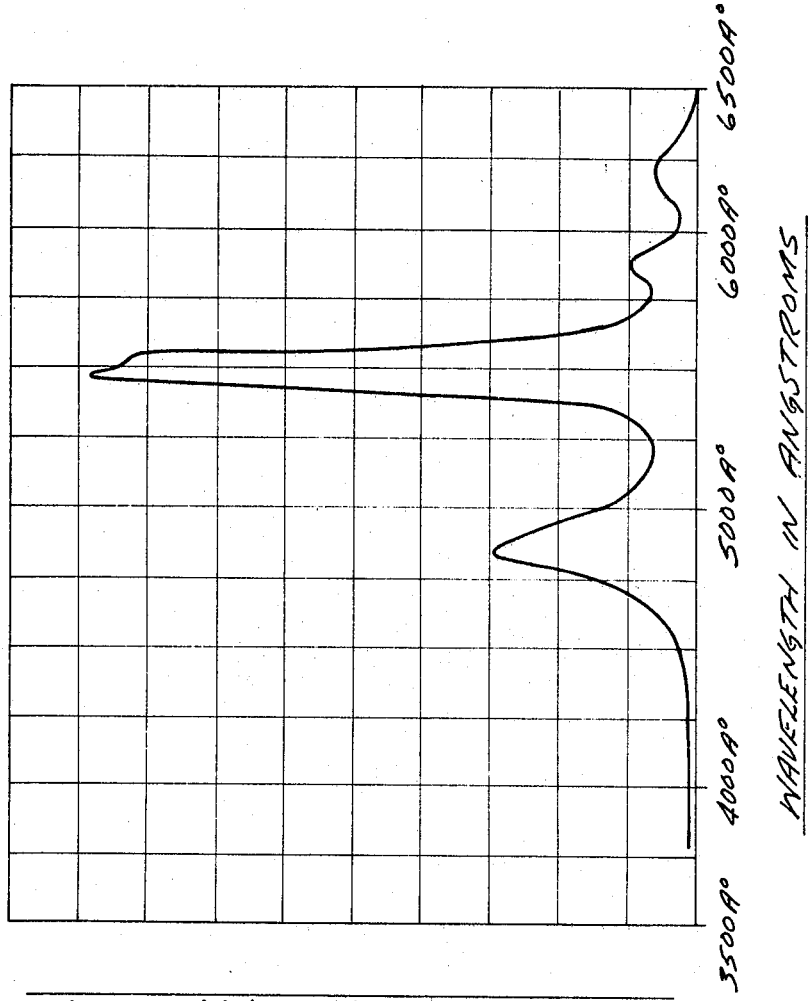

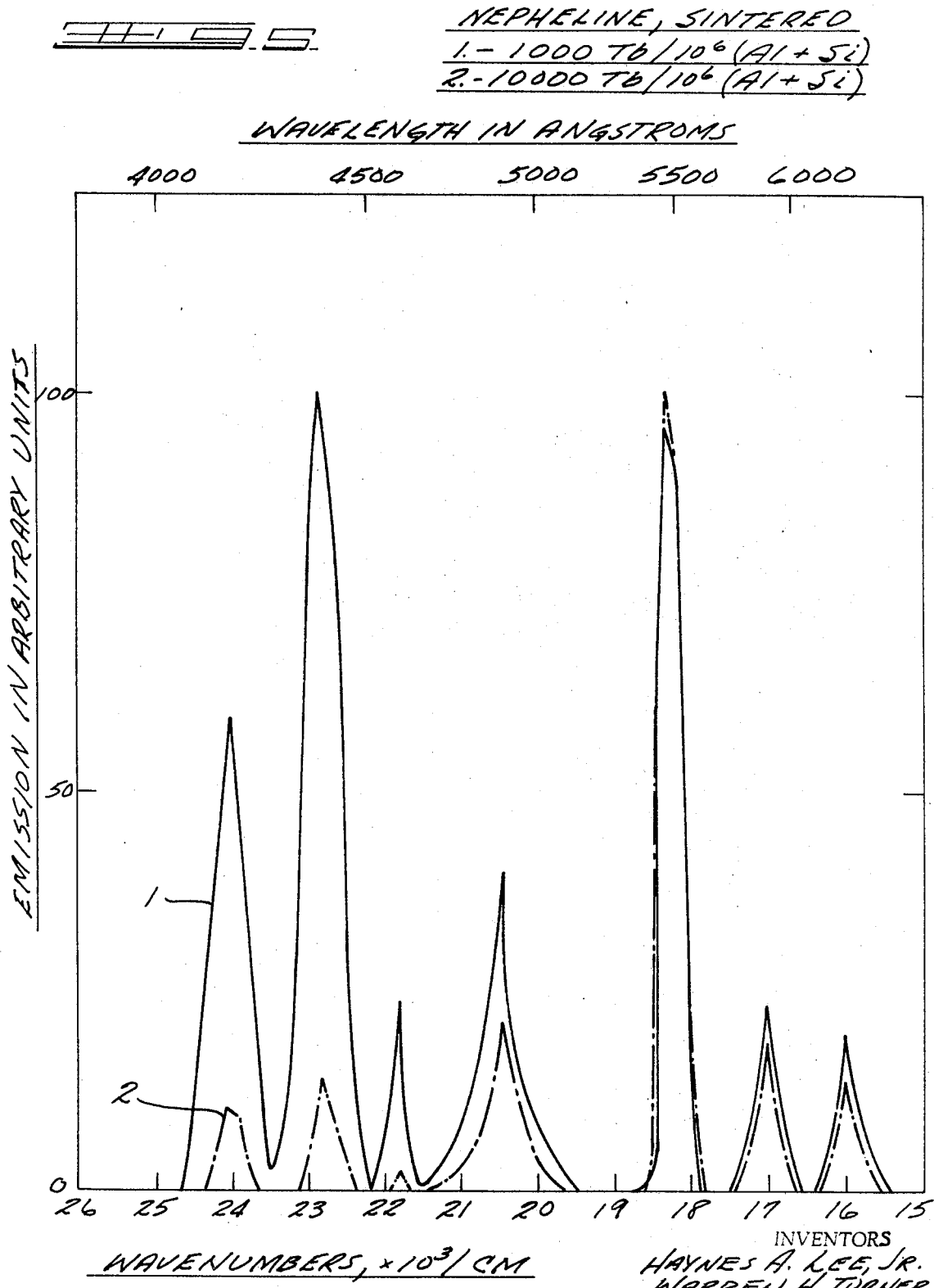

United States Patent Office 3,522,189
Patented July 28, 1970

---

3,522,189
LUMINESCENT MATERIAL OF TERBIUM DOPED CRISTOBALITE
Haynes A. Lee, Jr., Sylvania, and Warren H. Turner, Toledo, Ohio, assignors to Owens-Illinois, Inc., a corporation of Ohio
Filed Oct. 17, 1966, Ser. No. 587,180
Int. Cl. C09k *1/54*
U.S. Cl. 252—301.4
1 Claim

ABSTRACT OF THE DISCLOSURE

A luminescent material of cristobalite as the host, with terbium ion activator in a selected dosage providing a high purity yellow fluorescence output.

---

This invention relates to the conversion of invisible energizing radiations into luminescent emissions. More particularly, the invention relates to novel crystalline phosphors, and still more particularly, to novel crystalline phosphors having more desirable spectral outputs for visual use, as well as other improved properties. Still further, this invention relates to crystalline phosphors that are unexpectedly effective converters of cathode rays into visible light, for viewing as in cathode ray tubes.

INTRODUCTORY DISCUSSION

Luminescence is describable as photon emission initiated by nonthermal energy forms. In order for a solid to be luminescent under excitation conditions, it must have a suitable arrangement and population of the electronic energy levels in its constituent atoms. With a suitable arrangement, properly situated electrons are excited to higher energy levels under the influence of the excitation medium, and these electrons emit photons upon their spontaneous return from the higher energy level form to a lower energy level form.

Cathodoluminescent materials have found wide acceptance in cathode ray tubes such as television tubes, oscilloscope tubes and the like. These materials emit a radiation, for example visible radiation, on excitation with cathode rays and thel ike. Thus, they convert invisible energy forms into visible or other useful light forms. Examples of such commercial luminophors are calcium tungstate, copper-activated znc cadmium selenide, barium-lead sulfate, silver-activated zinc sulfide, various phosphates and miscellaneous tungstates and molybdates.

THE PROBLEM

The industry is constantly striving to upgrade the quality and output character of cathodoluminescent phosphors for visible use. Further, efforts are being made to reduce the costs of phosphors. To these ends the present invention is dedicated.

Heretofore, phosphors that have been used as coatings on the inner surfaces of cathodoluminescent devices have been characterized by a number of substantial problems as follows:

(1) Undesirable spectral output.—Thus, there has been too great a concentration of some color, such as blue, in the output of most phosphors for satisfactory visual use. Pure reds and yellows are very difficult to achieve. For instance, if there is an emission int he blue range, this imparts a greenish color to the eye. A desired output for visual use is a so-called pure yellow. Prior art practice has required blends of several activating agents for appropriate luminescent output.

(2) Limited compositional range of host materials.—Heretofore, existing cathodoluminescent phosphors have been severely limited as to the compositional range of the host carrier in which the luminescent output activator is contained. Typical materials of the prior art have been the phosphorous-containing compounds, from which the name phosphor is derived. Other materials have included borates of various kinds. Borates, in particular, have severe limitations as to physical properties, such as poor resistance to deterioration because of the low melting properties and the like.

(3) Difficulty of preparation.

In view of the foregoing, a substantial advance would be provided to the art of cathodoluminescent materials by an improved crystalline phosphor, having greater brightness, a more desirable spectral output and a pure spectral distribution for visual use, and that is easily manufactured.

Accordingly, objects of the present invention are, therefore, to provide novel cathodoluminescent phosphors having the characteristics enumerated.

FIG. 2 is a fluorescent spectral emission graph of fused silica activated with 1,000 atoms of terbium per million atoms of silicon;

FIG. 3 is a fluorescent spectral emission graph of sodium aluminate activated with 1,000 atoms of terbium per million atoms of aluminum;

FIG. 4 is a fluorescent spectral emission graph of sodium borate activated with 1,000 atoms of terbium per million atoms of boron; and, FIG. 5 is a fluorescent spectral emission graph of nepheline activated with 1,000 to 10,000 atoms of terbium per million atoms of aluminum and silicon atoms.

THE INVENTION—BROAD ASPECTS

Figure 1:
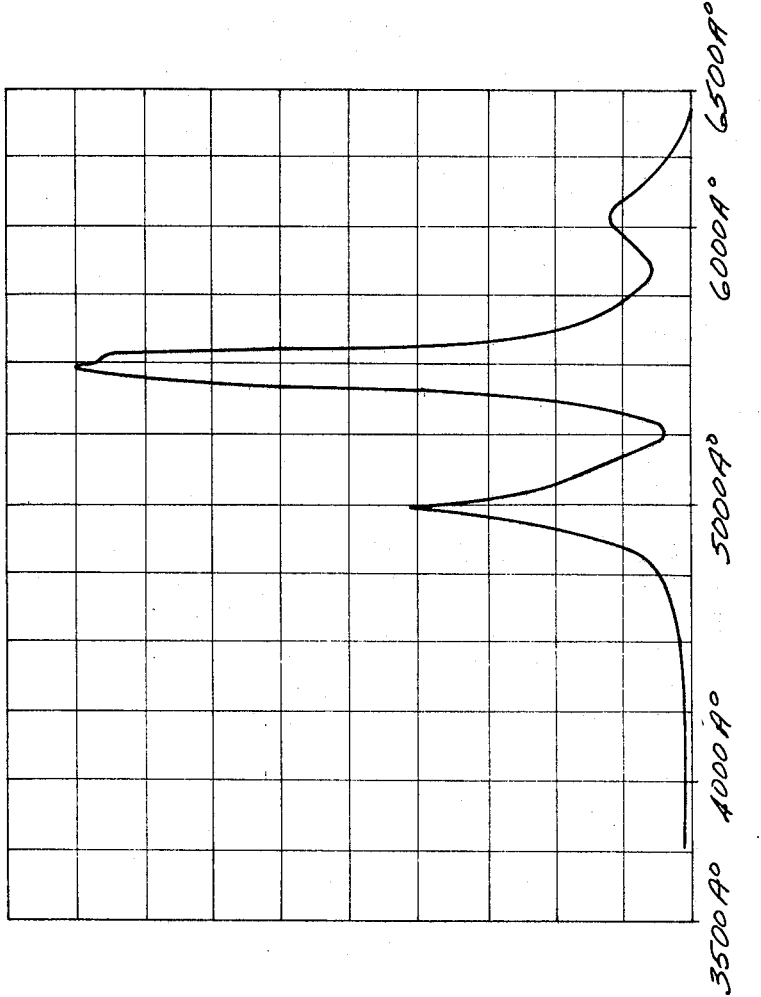
FIG. 1 is a fluorescent spectral emission graph of cristobalite activated with 1,000 atoms of terbium per million atoms of silicon in accordance with the present invention.

A unique contribution to the art is provided by the present invention, making it possible to produce cathode ray devices having a brighter and purer spectral output for visual use.

The present invention utilizes a host framework for the luminescent output activator, namely a rare earth element and more specifically terbium, which framework can have a wide compositional range. This is a unique advantage of the present invention.

The present invention encompasses the crystalline framework silicates, including cristobalite, carnegieite and analogous crystalline materials, and crystalline solid solutions thereof, as hosts for terbium as the cathodoluminecent output activator. The combination host materials and phosphors of the invention exhibit the above-noted favorable characteristics. In the extended scope of the invention, analogues include tridymite, eucryptite, kalsilite and the feldspar group in general. In a still further extended scope of the invention, disodium calcium orthosilicate is also included as a host.

It is to be pointed out that the crystalline structures of $BeF_2$, $BPO_4$ and $BAsO_4$ are also analogous to the framework silicate structure. Therefore, these are to be considered within the scope of the invention.

Crystalline framework silicate, as used herein, can be derived from the $SiO_2$ composition wherein the ratio of Si to 0 is 1:2. For instance, albite ($NaAlSi_3O_8$) can be derived from the $Si_4O_8$ composition by substituting one aluminum atom for one silicon atom, the excess negative charge being compensated for by the simultaneous addition of one monovalent cation, which in the case of albite is sodium.

The crystalline framework silicates are a family of structurally similar but compositionally dissimilar materials ranging from silica to sodium aluminate, $Na_4Al_4O_8$.

Empirically, these can be defined as nonvitreous, crystalline materials having the framework silicate structure:

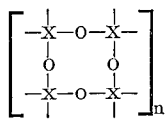

wherein the ratio of X:O=1:2 and wherein X is selected from $Si^{4+}$ and $Al^{3+}$, and wherein for each $Al^{3+}$ substituted or selected, there is provided at least one further + charge by way of an alkali metal ion (Li, Na, K, Rb and Cs) or by way of one-half alkaline earth metal ion (Be, Mg, Ca, Sr and Ba) combinations thereof. Preferably, the + charges are provided by Li, Na and K of the alkali metals and Ca, Sr and Ba from the alkaline earth metals.

In a preferred aspect of the invention, the ratio of Al to Si will not exceed 1:1.

Of course, it is to be understood and intended by the foregoing definition that combinations of Al and Si may exist in the same structure; that is, one X may be Al and another X may be Si.

Specific framework silicates include silica, quartz and modifications thereof including the high temperature forms cristobalite, tridymite, etc. Complete idealized compositional end members which may exist within the preferred range of the invention, but not by way of limitation, contemplate petalite ($LiAlSi_4O_{10}$), orthoclase

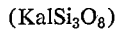

albite ($NaAlSi_3O_8$), celsian ($BaAl_2Si_2O_8$), and anorthite ($CaAl_2Si_2O_8$), eucryptite ($LiAlSiO_4$), nepheline

and kalsilite ($KAlSiO_4$) and solid solutions thereof. Such members are given by way of illustration and are intended as compositional and/or solid solution areas rather than crystal species per se. In the practice of this invention, especially suitable results have been obtained by dry sintering to produce these crystalline framework silicates.

As albite and orthoclase are approached compositionally, it becomes increasingly difficult to obtain a crystalline phase by the dry sintering process. The kinetics of crystal formation become so slow that it becomes uneconomical to produce the crystalline phase in this manner.

The rare earth elements have been heretofore used in the preparation of luminescent materials. In the art, such rare earth elements have been used as activators, that is they have been used as intentionally added "impurity" materials.

Optimum luminescent properties are obtained in the present invention with proportions of activating material on the order of about 20 to 20,000 parts of activator per million parts of host.

REVIEW OF THE ART

It has been suggested prior to the present invention (see Olby U.S. Pat. 3,171,753) that a zirconium silicate-terbium compound can be used as a ceramic stain. Calcination of $ZrO_2$-$SiO_2$-NaF mixture containing $TbF_3$ at 905° F. for one hour produced a yellow colored material. The stains, according to the patent, can be incorporated into frits for firing as color glazes onto ceramic tiles. No fluorescence is attributed to this colored glaze.

Keller Pat. 2,979,467 discloses infrared ray stimulatable phosphors to produce luminescence of various predominate colors such as red, etc. According to this disclosure, double activators are utilized in the form of rare earth compounds. One specific pair combination disclosed is that of terbium and samarium. The host disclosed is strontium sulfide, prepared in a very particular manner. All other bases or hosts disclosed are of the alkaline earth sulfide series.

Other known prior art patents use orthophosphates with terbium in minor amounts (see U.S. Pat. 3,025,423).

Still further, it is known to use terbium in maser crystals, and these are usually tungstates and molybdates of various kinds.

The prior art analysis makes it evident that host materials for cathodoluminescent terbium activation have heretofore been very limited in scope.

It will be evident from the host materials listed above that the present invention provides a wide compositional range of host materials.

The phosphors of the present invention can be prepared in the manners illustrated in the following examples.

EXAMPLE I

An aqueous solution of $Tb(NO_3)_3 \cdot 6H_2O$ was added to powdered silica in an amount to provide 1,000 atoms of Tb per million atoms of Si. Thereafter, the mixture was dried overnight. Following the drying, the mixture was fired at 2000° F. for 3 hours to sinter.

Cristobalite form crystals were derived from the silica with the terbium fluorescent activator interspersed in the crystalline phase. Cristobalite is a high temperature form of silica.

The product was tested for spectral output by radiating with ultraviolet rays, filtered to a wave length of 2537 angstroms. Under these conditions, the phosphor displayed a very bright and pure yellow luminescence as shown in FIG. 1 of the drawings. Although the color under cathode ray exposure will be the same as in this photoluminescent test, the brightness under the cathode ray bombardment may differ substantially.

The product was also tested for cathodoluminescence by subjecting it to the output of a Tesla coil in vacuo. A bright yellow luminescent output was visually observed.

By way of comparison, a run was made wherein terbium was added to fused silica. As shown in FIG. 2, the emission from fused silica is considerably different, having emission lines in the blue and ultraviolet range of the spectrum, which is lacking from the spectrum of FIG. 1. The blue of FIG. 2 imparts a greenish color to the eye.

The pure yellow output of FIG. 1, as compared with the blue in FIG. 2, provides a spectrum for viewing by the eye. Thus, a substantial advance to the art is provided by the present invention.

EXAMPLE II

Aqueous terbium nitrate was added to sodium aluminate powder ($NaAlO_2$) in an amount to provide 1,000 atoms of terbium per million atoms of aluminum. The powdered admix was dried and fired until evolution of volatiles was complete. The resulting crystalline phosphor was quantitatively and qualitatively tested for spectral output as in Example I, using both ultraviolet and a Tesla coil. Under these conditions, the phosphor displayed a yellow emission. As shown in FIG. 3, the emission is quite similar to that of FIG. 1.

EXAMPLE III

Nonpredictability of photoluminescence and cathodoluminescence

Sodium borate, doped with terbium, was tested for photoluminescence. The sodium borate contained 1,000 parts of terbium per million parts and as shown in FIG. 4 has essentially the same yellow emission as produced by the materials of Examples I and II. Thus, a substantial peak between 5,000 and 6,000 angstroms is produced which is fairly pure yellow output. However, cathodoluminescence of this material was substantially nil by the Tesla coil test.

EXAMPLE IV

Nepheline ($NaAlSiO_4$) was doped with 1,000 and 10,000 atoms of terbium per million atoms of X (Al and Si)) in the manner described in Examples I and II. Crystallization was effected by dry sintering at a temperature below the melting point of the crystalline phase until evolution of volatiles was complete.

The resulting crystalline phosphors were quantitatively tested for spectral output as in the foregoing examples. Under these conditions, the phosphors displayed blue for the 1,000 terbium level and yellow for the 10,000 terbium level. Results are shown in FIG. 5.

Results with intermediate amounts of terbium show that increasing amounts of terbium shift the output from blue to yellow.

As indicated above, there is a preferred range wherein the ratio of aluminum to silicon does not exceed 1:1. The reason for the preferred range is that the crystalline phosphors are not as critical to make or sinter. Further, they are brighter since higher terbium levels can be achieved. For instance, 2,000 parts of terbium per million atoms X did not show increased brightness when added as in Example II and FIG. 3. Presumably, the solution limit of terbium has been exceeded at the 1,000 atoms level. Although this tends to be the case towards the high silicon end, it is not a general rule in the preferred range. In fact, as the 1:1 ratio is approached, the terbium level can be increased up to 10,000 parts of terbium per million parts of X. This is not to be construed as an absolute limit on the invention.

Luminescent materials of the present invention are adapted for use in many ways in cathode ray tube applications and in other high energy radiation devices.

For such uses, the aggregate crystalline forms achieved by the present invention are ground or otherwise comminuted to a particle size of about 1 to 20 microns, and then deposited on a suitable substrate. One typical substrate is clear glass. A binder is utilized to assure uniform phosphor deposition.

An advantage of the phosphors of the present invention is that they may be ground to fine particle size without exhibiting sensitivity to deterioration by chemical attack or by the excitation medium such as cathode rays.

Luminescent articles prepared by the present invention comprise at least one of the aforementioned luminophors, optionally in admixture with conventional luminescent materials, intimately associated or in adherent contact with a protective layer of a material transparent to radiation emitted by the luminophors, that is visible, and particularly yellow light. The particular structure of the luminescent articles and the manner in which the luminophor is embedded therein depends to a great extent upon the utility for which such articles are to be used. The luminophor, for example, can be embedded in the transparent material, adhered to one or more surfaces thereof, combined with just sufficient binder to hold the luminophor particles together and sandwiched between two layers of transparent material, or a combination of these. In cathode ray tubes, the luminophor is conveniently merely adhered to the inner surface of the tube.

Luminophors can be associated with one or more protective layers transparent to emitted radiation. For example, a luminophor can be combined with a binder and sandwiched between two or more adherent protective layers, or the luminophor and binder thereof can be coated on the surface of a material transparent to emitted radiation. The shape of the luminescent articles is not critical. Thus, they can be flat or curved.

Examples of materials transparent to radiation emitted by the aforementioned phosphors are organic polymeric materials such as homopolymers and copolymers of alkyl acrylates and methacrylates such as methyl methacrylate; polyvinyl acetate; polyethylene; chlorosulfonated polyethylene; polypropylene; polystyrene; polyepoxides; polyesters such as polyethylene terephthalate; polyacrylonitrile; homopolymers and copolymers of vinyl chloride; polyvinyl alcohol; cellulose derivatives such as nitrocellulose and ethylcellulose; inorganic materials such as various glasses incuding silicate and borate glasses, and transparent crystalline materials such as lithium fluoride and sodium chloride; as well as various compatible mixtures thereof.

The particular method of fabrication of luminescent articles is not the essence of this invention; any of the conventional techniques therefore can be employed. However, by way of illustration, the novel luminophors can be finely ground and, if desired, mixed with other luminescent materials. This is one way of enhancing other luminescent materials which are more prone to deterioration than the materials in the present invention. Other luminescent materials would include calcium tungstate and the like. Thus, light of a particular color balance or tone can be achieved. The resulting compositions can be dispersed in a solution or dispersion of a binder, for example a binder of one or more of the aforementioned materials transparent to emitted radiation, together with any of the conventional organic or inorganic solvents or dispersants therefor. The resulting compositions can then be coated onto a surface, for example the interior of a cathode ray tube, and the solvent or dispersant evaporated to yield a luminescent coating wherein the phosphor is embedded in a layer of binder that is transparent to incident and emitted radiation. Such dispersions of luminophor and binder can also be cast into self-supporting sheets and films.

Cathode ray tubes can be prepared, for example by milling a luminophor of the invention to a finely divided state such as 3 to 12 microns, and adding a low viscosity ethylcellulose or nitrocellulose dissolved in xylol and dibutylphthalate. The resulting composition can then be added to the inner surface of a standard cathode ray tube as by conventional flushing, flow or spray methods, and dried. Finally, the coated tube can be heated to a temperature just below the melting point of the glass tube, usually a temperature greater than 700° C., to oxidize and remove the organic binder and adhere the luminophor directly to the glass. The resulting product is a layer of luminophor of the invention adhered to the inner surface of a tubular protective layer of glass.

EXTENDED SCOPE OF THE INVENTION

Within the scope of this invention, cathodoluminescent device means any apparatus in which any high energy level energizing radiation is converted to luminescent emissions. Within the scope of the invention, luminophor means the material, regardless of shape or form, in a luminescent device, which effects the conversion of energizing radiation into luminescent emission.

While 2537 angstroms has been mentioned above as the ultraviolet source for testing purposes, it has been noted that substantially any ultraviolet absorption by terbium produces essentially the same spectral qualities. The brightness will, however, vary with strong to weak absorption.

It will be understood that these novel products are cathodoluminescent. Further, it will be obvious to those skilled in the art that cathode rays fall within a broad group of high level excitation energy media. While no claims are made relative to other excitation media, such as X-rays or the like, the present invention, however, is not to be limited should it subsequently be found that these glasses possess sensitivities other than those disclosed.

The spectral output curves, included as the figures of the drawings, are based upon photoluminescent tests for convenience. Also, rough cathodoluminescent tests were run to substantiate the cathodoluminescent properties. In order to run highly accurate cathodoluminescence tests, the samples must be placed under vacuum and bombarded with cathode rays. Because of the bright emissions produced by the rough cathode ray tests, it may be understood that the primary importance of the invention resides in the cathodoluminescence field.

Generically, the compositional range of the host materials of this invention can be characterized as the framework silicates.

Also, the present hosts are unique in that they are physically strong, durable and high melting. These characteristics provide substantial advantages over low melting phosphors of the prior art. Thus, greatly improved stability against deterioration by both chemical agents and excitation radiation is provided.

We claim:
1. A luminescent material consisting essentially of
   as host, in predominant amount, cristobalite,
   as luminescent activator, terbium ions, with the terbium ions distributed homogeneously throughout the crystal lattice of the host, and wherein the terbium ions are present at a level of about 1000 per million atoms of silicon of the host.

References Cited

UNITED STATES PATENTS

| | | |
|---|---|---|
| 3,260,675 | 7/1966 | McAllister. |
| 3,373,302 | 3/1968 | Barber _____ 252—301.4 |

OTHER REFERENCES

De Ment, Fluorochemistry, 1945, pp. 465–467.

TOBIAS E. LEVOW, Primary Examiner

R. D. EDMONDS, Assistant Examiner